(12) United States Patent  
Takahashi (10) Patent No.: US 10,087,855 B2  
(45) Date of Patent: Oct. 2, 2018

(54) CONTROL METHOD AND CONTROL DEVICE FOR INTERNAL COMBUSTION ENGINE

(71) Applicant: NISSAN MOTOR CO., LTD., Yokohama-shi, Kanagawa (JP)

(72) Inventor: Eiji Takahashi, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/740,537

(22) PCT Filed: Jul. 2, 2015

(86) PCT No.: PCT/JP2015/069094  
§ 371 (c)(1),  
(2) Date: Dec. 28, 2017

(87) PCT Pub. No.: WO2017/002254  
PCT Pub. Date: Jan. 5, 2017

(65) Prior Publication Data  
US 2018/0187612 A1 Jul. 5, 2018

(51) Int. Cl.  
*F02D 15/02* (2006.01)  
*F02D 23/00* (2006.01)  
(Continued)

(52) U.S. Cl.  
CPC .......... *F02D 15/02* (2013.01); *F01L 13/0026* (2013.01); *F02B 75/048* (2013.01);  
(Continued)

(58) Field of Classification Search  
CPC .......... F02D 15/00; F02D 15/02; F02D 23/00; F02D 23/005; F02D 19/06;  
(Continued)

(56) References Cited

U.S. PATENT DOCUMENTS

| 4,492,203 A | 1/1985 | Yutaka |
| 5,549,095 A * | 8/1996 | Goto .................... F02D 13/0234 123/316 |

(Continued)

FOREIGN PATENT DOCUMENTS

| JP | 58-217740 A | 12/1983 |
| JP | 2005-155507 A | 6/2005 |

(Continued)

*Primary Examiner* — John Kwon  
*Assistant Examiner* — Johnny H Hoang  
(74) *Attorney, Agent, or Firm* — Foley & Lardner LLP (57) ABSTRACT

For example, during an acceleration transient period of time during which a demand load is raised, a supercharging pressure is raised before a mechanical compression ratio is lowered and an internal combustion engine falls in a high load state. At this time, there is a possibility that a generation of knocking and an excessive rise in a cylinder inner pressure occur. This possibility is a task to be solved. The internal combustion engine includes: a variable compression ratio mechanism which is capable of modifying the mechanical compression ratio; a turbo charger (2) which supercharges intake air utilizing an exhaust energy; and an exhaust bypass valve (7) which adjusts a supercharging pressure as a supercharging pressure adjustment mechanism. The mechanical compression ratio is detected by a control shaft sensor (34) and the supercharging pressure is limited on a basis of this mechanical compression ratio.

5 Claims, 8 Drawing Sheets

(51) Int. Cl.
*F02B 75/04* (2006.01)
*F01L 13/00* (2006.01)
*F02D 19/06* (2006.01)
*F02D 41/10* (2006.01)
*F02D 41/00* (2006.01)
*F02D 31/00* (2006.01)
*F02D 41/30* (2006.01)

(52) U.S. Cl.
CPC ....... *F02D 19/0673* (2013.01); *F02D 23/005* (2013.01); *F02D 31/005* (2013.01); *F02D 41/0007* (2013.01); *F02D 41/0052* (2013.01); *F02D 41/10* (2013.01); *F02D 41/3035* (2013.01)

(58) Field of Classification Search
CPC .. F02D 19/0673; F02D 41/04; F02D 41/0007; F02D 2041/001; Y02T 10/144; Y02T 10/121; Y02T 10/42
USPC ............. 701/102, 103, 114, 115; 123/90.15, 123/90.23, 559.1, 559.2, 78 R
See application file for complete search history.

(56) References Cited

U.S. PATENT DOCUMENTS

| | | | |
|---|---|---|---|
| 7,360,513 | B2 | 4/2008 | Takemura et al. |
| 2001/0047778 | A1* | 12/2001 | Aoyama ................. F02B 67/00 123/78 R |
| 2008/0190406 | A1 | 8/2008 | Akihisa et al. |
| 2014/0067230 | A1* | 3/2014 | Liu ..................... F02D 41/0007 701/102 |
| 2015/0113981 | A1* | 4/2015 | Marlett ................... F02B 37/12 60/602 |
| 2015/0136089 | A1* | 5/2015 | Tanaka ................ F02D 41/1446 123/48 R |
| 2015/0219024 | A1 | 8/2015 | Kurashima |
| 2015/0260113 | A1* | 9/2015 | Tanaka .................... F02B 37/18 60/602 |

FOREIGN PATENT DOCUMENTS

| | | |
|---|---|---|
| JP | 2006-226133 A | 8/2006 |
| JP | 2007-162592 A | 6/2007 |
| JP | 2008-2328 A | 1/2008 |
| JP | 2009-185669 A | 8/2009 |
| JP | 2011-51542 A | 3/2011 |
| WO | WO 2014/046059 A1 | 3/2014 |

* cited by examiner

CONTROL METHOD AND CONTROL DEVICE FOR INTERNAL COMBUSTION ENGINE

TECHNICAL FIELD

The present invention relates to a control for an internal combustion engine having a variable compression ratio mechanism which is capable of modifying a mechanical compression ratio.

BACKGROUND ART

A patent document 1 describes a technology determining a fuel increment value for a prevention of an overheat of a catalyst on a basis of a load relation value and a mechanical compression ratio in order to reduce a temperature of the catalyst disposed in an exhaust passage, as a control for an internal combustion engine in which a variable compression ratio mechanism which is capable of modifying the mechanical compression ratio, the mechanical compression ratio being a geometrical compression ratio of the internal combustion engine, is equipped.

Pre-Published Document

Patent Document 1: A Japanese Patent Application First (Laid-open) Publication No. 2009-185669

DESCRIPTION OF INVENTION

Problem to be Solved by the Invention

In the internal combustion engine in which a turbo charger supercharging intake air utilizing an exhaust energy is equipped, for example, in order to prevent a generation of knocking and an excessive rise in an cylinder inner pressure, at an acceleration transient period, the variable compression ratio mechanism modifies the mechanical compression ratio from a high compression ratio side to a low compression ratio side. However, when a supercharging pressure becomes high before this mechanical compression ratio becomes sufficiently lowered, there is a possibility that the generation of knocking and the excessive cylinder inner pressure rise are introduced.

As a countermeasure to avoid such a generation of knocking and excessive cylinder inner pressure rise as described above, it can be thought that a fuel increment is carried out in order to enlarge a retardation angle quantity of an ignition timing and suppress a rise in an exhaust temperature involved in the retardation of the ignition timing. However, there is a possibility that, when the retardation angle quantity becomes too large, a degree of the fuel increment becomes excessive so that, in addition to a reduction of a fuel economy due to an excessive rich in an air-fuel mixture, such problems as an emission of smoke, a combustion failure, a carbon fouling of ignition plugs, and so forth occur.

Means for Solving Problems

Thus, according to the present invention, a variable compression ratio mechanism which is capable of modifying a mechanical compression ratio, a supercharger which supercharges intake air, and a supercharging pressure adjustment mechanism which adjusts a supercharging pressure are equipped, the mechanical compression ratio is detected, and the above-described supercharging pressure is limited on a basis of this mechanical compression ratio.

In this way, by limiting the supercharging pressure on a basis of the mechanical compression ratio, for example, at the acceleration transient period at which the supercharging pressure is raised, such a problem that the rise in the supercharging pressure before the reduction of the mechanical compression ratio brings about a high load state can be avoided.

Effect of Invention

According to the present invention, a delay of a change in the mechanical compression ratio with respect to the change in the supercharging pressure is suppressed and a worsening of an engine drivability involved in this delay can be suppressed.

EMBODIMENT FOR CARRYING OUT THE INVENTION

Figure 1:
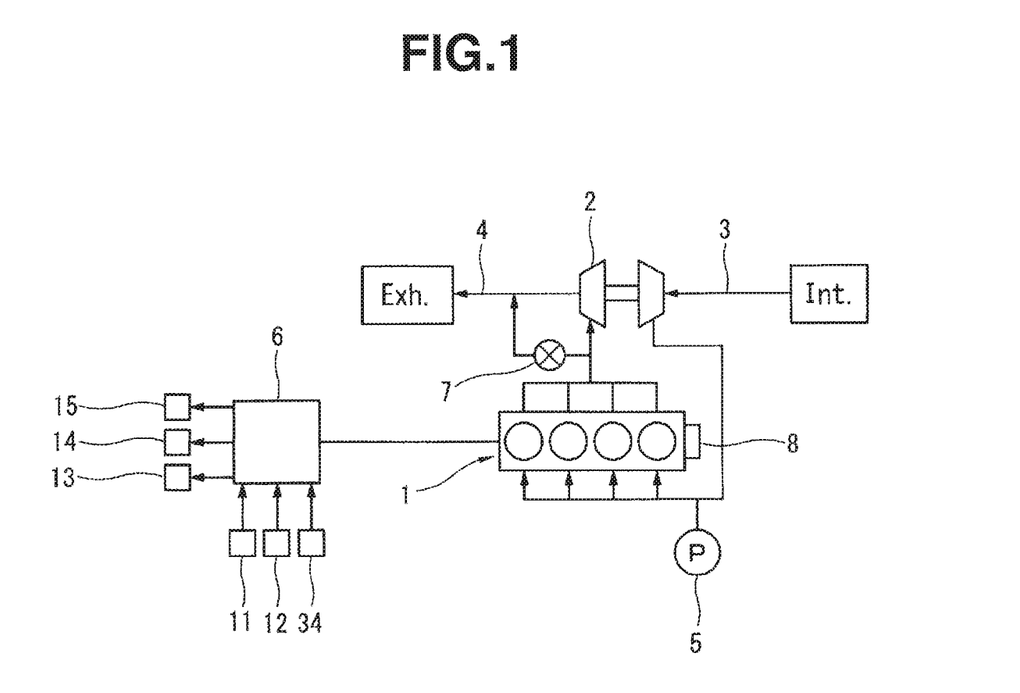
FIG. 1 is a configuration view simply representing an internal combustion engine in which a turbo charger is equipped in a preferred embodiment according to the present invention.

Hereinafter, the present invention will be described in terms of a preferred embodiment shown in drawings. As shown in FIG. 1, a turbo charger 2 is disposed between an exhaust passage 4 and intake passage 3 to supercharge intake air utilizing an exhaust energy in an internal combustion engine 1 to which a preferred embodiment according to the present invention is applied. An output of the internal combustion engine is gear shifted by an automatic transmission 8 and is transmitted to driving wheels.

A control section 6 has a function to store and execute various types of engine controls. On a basis of signals inputted from an engine rotation number sensor 11, an accelerator pedal sensor 12 which detects a depression quantity of an accelerator pedal and detects a depression speed thereof, and so forth, control section 6 outputs control signals to fuel injection valves 14 and ignition plugs 15 to control a throttle opening angle, a fuel injection quantity, a fuel injection timing, an ignition timing, and so forth. In addition, control section 6 adjusts an opening angle of an exhaust (gas) bypass valve 7 as a supercharging pressure adjusting mechanism on a basis of the supercharging pressure detected by supercharging pressure sensor 5 to control the supercharging pressure to a desired target supercharging pressure.

Figure 2:
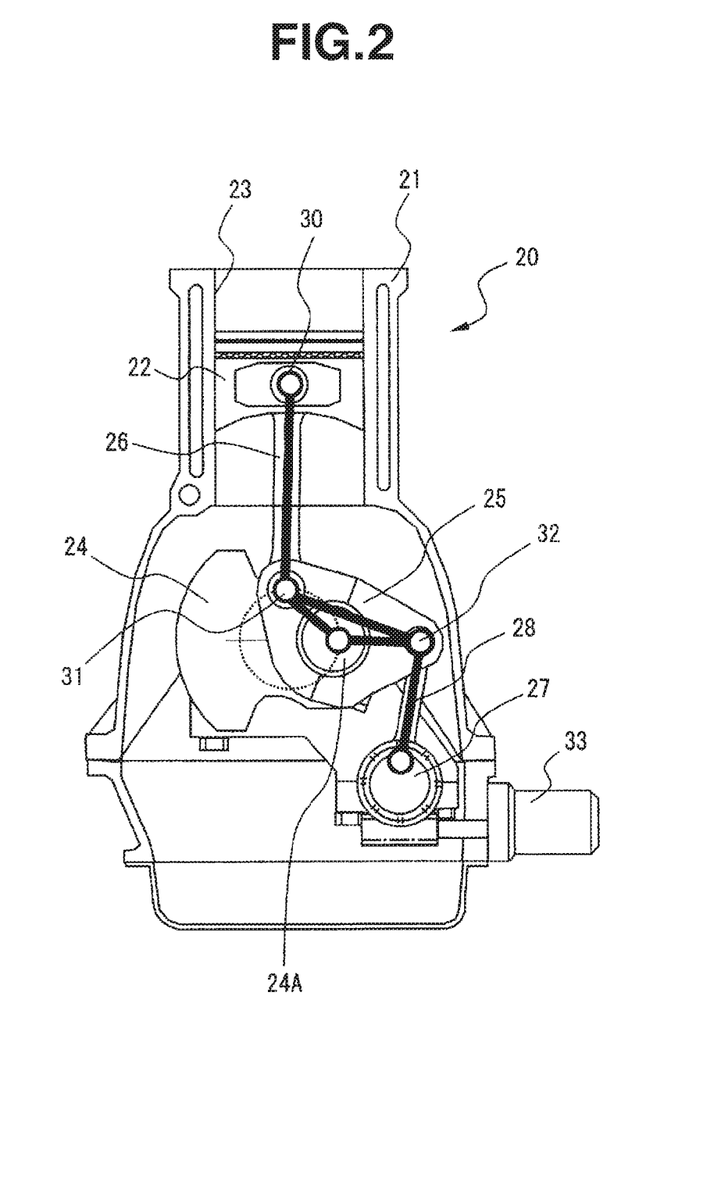
FIG. 2 is a configuration view simply representing a variable compression ratio mechanism in the preferred embodiment.

FIG. 2 shows a variable compression ratio mechanism 20 utilizing a double link type piston-crank mechanism. It should be noted that, since this mechanism is well known as described in a Japanese Patent Application Laid-open Publication No. 2006-226133, only a brief outline of this mechanism will herein be given. In a cylinder block 21 constituting a part of an engine main frame of the internal combustion engine, a piston 22 of each cylinder is slidably fitted into a corresponding one of cylinders 23 and a crankshaft 24 is rotatably supported by cylinder block 21. Variable compression ratio mechanism 20 includes: a lower link 25 rotatably attached to a crank pin 24A of crankshaft 24; an upper link 26 linking this lower ink 25 and piston 22; a control shaft 27 rotatably supported at an engine main frame side of cylinder block 21, and so forth; and a control link 28 linking a control eccentric shaft section disposed eccentrically to control shaft 27 and lower link 25. Piston 22 and an upper end of upper link 26 are relatively rotatably linked via a piston pin 30. A lower end of upper link 26 and lower link 25 are relatively rotatable via a first linkage pin 31 and an upper end of control link 28 and lower link 25 are relatively rotatably linked via a second linkage pin 32. A lower end of control link 28 is rotatably attached to a control eccentric shaft section of control shaft 27.

A drive motor 33 is linked to control shaft 27 as an actuator. This drive motor 33 causes a rotation position of control shaft 27 to be modified and held so that, in association with a change in posture of lower link 25, a piston stroke characteristic including a piston upper dead center and a piston bottom dead center is varied and the mechanical compression ratio is accordingly varied. Hence, by drivingly controlling drive motor 33 through above-described control section 6 (refer to FIG. 1), the mechanical compression ratio can be controlled in accordance with an engine driving condition. Specifically, as a device for detecting an actual mechanical compression ratio modified by variable compression ratio mechanism 20, a control shaft sensor 34 (refer to FIG. 1) detecting the rotation position of control shaft 27 corresponding to this mechanical compression ratio is disposed. Control section 6 performs a feedback control of drive motor 33 in order to maintain the actual mechanical compression ratio in proximity of a target compression ratio on a basis of the mechanical compression ratio detected by control shaft sensor 34.

Figure 3:
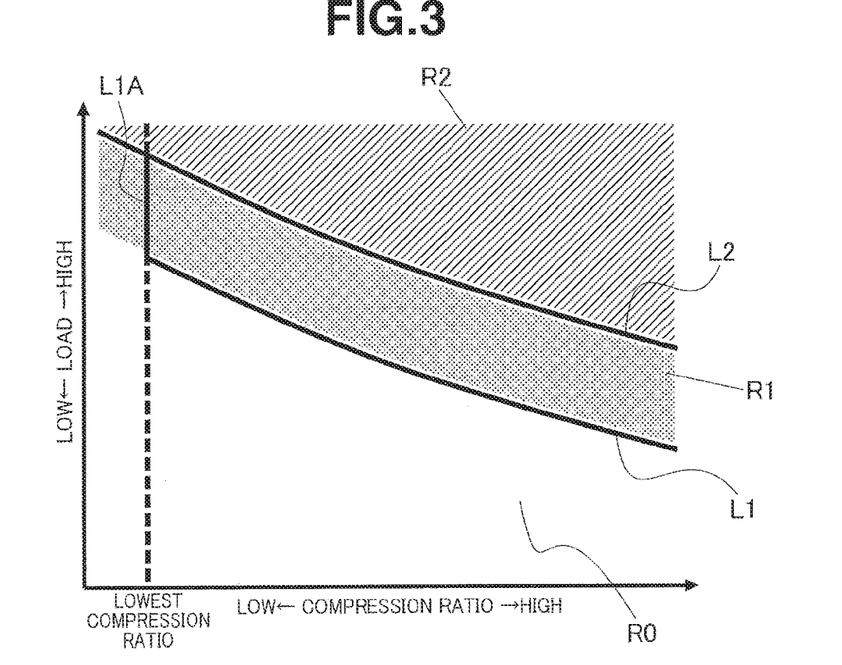
FIG. 3 is an explanatory view representing a first limiter and a second limiter.

FIG. 3 shows an explanatory view representing a relationship between the mechanical compression ratio and a load corresponding to the supercharging pressure. A region R1 which is in a higher load side than a first limiter L1 in FIG. 3 is an area (a richer side than a stoichiometric air-fuel mixture ratio) required to perform a fuel increment in order to reduce an exhaust temperature and a region R0 which is in a lower load side than first limiter L1 is an area in which the driving at the stoichiometric air-fuel mixture ratio or the driving at a leaner side than the stoichiometric air-fuel mixture ratio is possible. In addition, a region R2 at a higher load side than a second limiter L2 is an area which becomes excessively rich in the mixture ratio to introduce a generation of smokes or so forth.

Figure 4:
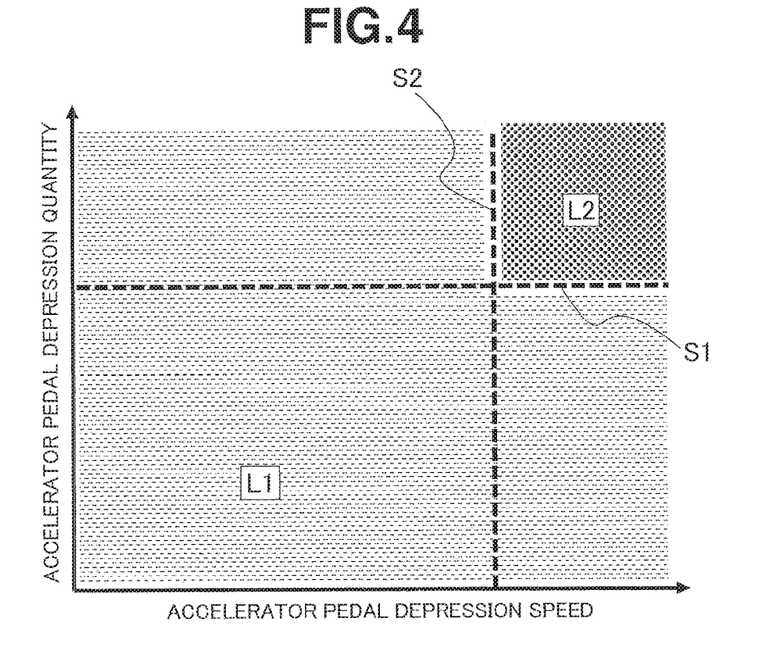
FIG. 4 is an explanatory view representing a determination on a degree of pace of a rise in a demand load.

FIG. 4 shows a control map to determine a degree of pace of the demand load at an acceleration transient period involved in a depression operation of the accelerator pedal by a driver. As shown in FIG. 4, first limiter L1 and second limiter L2 to place a limitation for the upper limit of the supercharging pressure are switched therebetween so that the supercharging pressure is limited to be equal to or lower than a selected supercharging pressure. Specifically, in a case where a depression quantity (depth) of the accelerator pedal is in excess of a predetermined first threshold value S1 and a depression speed of the accelerator pedal is in excess of a predetermined second threshold value S2, the supercharging pressure is limited to second limiter L2 or lower. In another case, namely, in a case where the accelerator pedal depression quantity is equal to or shallower (smaller) than first threshold value S1 or the accelerator pedal depression speed is equal to or slower (smaller) than second threshold value S2, the supercharging pressure is limited to first limiter L1 or lower.

It should be noted that, as shown in FIG. 3, in a lowest compression ratio (a lowest value of a variable range), a part L1A of first limiter L1 enters within fuel increment region R1 and is set such as to enable to reach to the supercharging pressure equal to second limiter L2. It should be noted that, in a non-supercharging area, the driving at the stoichiometric air-fuel mixture ratio is possible even under the maximum compression ratio and a load limitation through limiters L1, L2 is carried out only under a situation in which the supercharging pressure is given.

Figure 5:
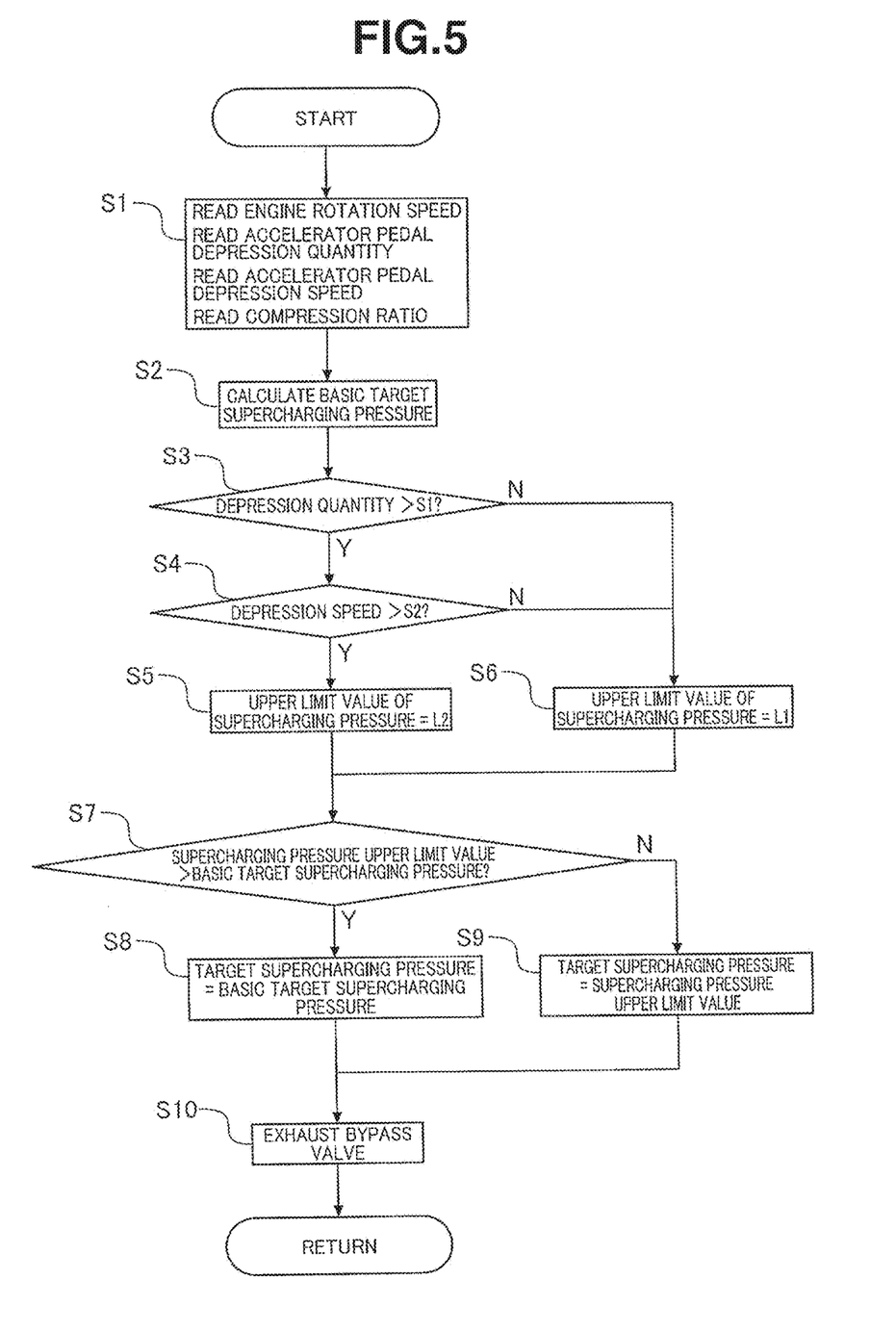
FIG. 5 is a flowchart representing a flow of a supercharging pressure control in the preferred embodiment.

FIG. 5 shows a flowchart representing a flow of control which limits the supercharging pressure in the preferred embodiment.

First, at a step S1, control section 6 reads the engine rotation speed, the depression quantity of the accelerator pedal, the depression speed of the accelerator pedal, and the mechanical compression ratio. Next, at a step S2, control section 6 calculates a basic target compression ratio by referring to a control map preset and stored on a basis of the engine rotation speed and the accelerator pedal depression quantity. At a step S3, control section 6 determines whether the accelerator pedal depression quantity is larger than a first threshold value S1. At a step S4, control section 6 determines whether the accelerator pedal depression speed is larger than a second threshold value S2. If both of steps S3 and S4 are positive (affirmation), the routine goes to a step S5. If at least one of steps S3, S4 is negative (non-affirmation), the routine goes to a step S6.

At step S5, control section 6 calculates second limiter L2 by referring to the control map preset and stored in control section 6 on a basis of the engine rotation speed and the mechanical compression ratio and sets this second limiter L2 to a supercharging pressure upper limit value and the routine goes to a step S7. At a step S6, control section 6 calculates first limiter L1 by referring to the preset and stored control map and sets this first limiter L1 to the supercharging pressure upper limit value.

At step S7, control section 6 determines whether the supercharging pressure upper limit value is larger than a basic target supercharging pressure. If the supercharging pressure is larger than the basic target supercharging pressure, the routine goes from a step S7 to a step S8 in which a target supercharging pressure is set as the basic target supercharging pressure. If the supercharging pressure upper limit value is equal to or below the basic target supercharging pressure, the routine goes to a step S9 and, at step S9, the target supercharging pressure is set to the supercharging pressure upper limit value set at step S5 or at step S6. At step S10, an opening angle of exhaust bypass valve 7 of turbo charger 2 is drivingly controlled on a basis of the target supercharging pressure set at step S8 or step S9.

Figure 7A:
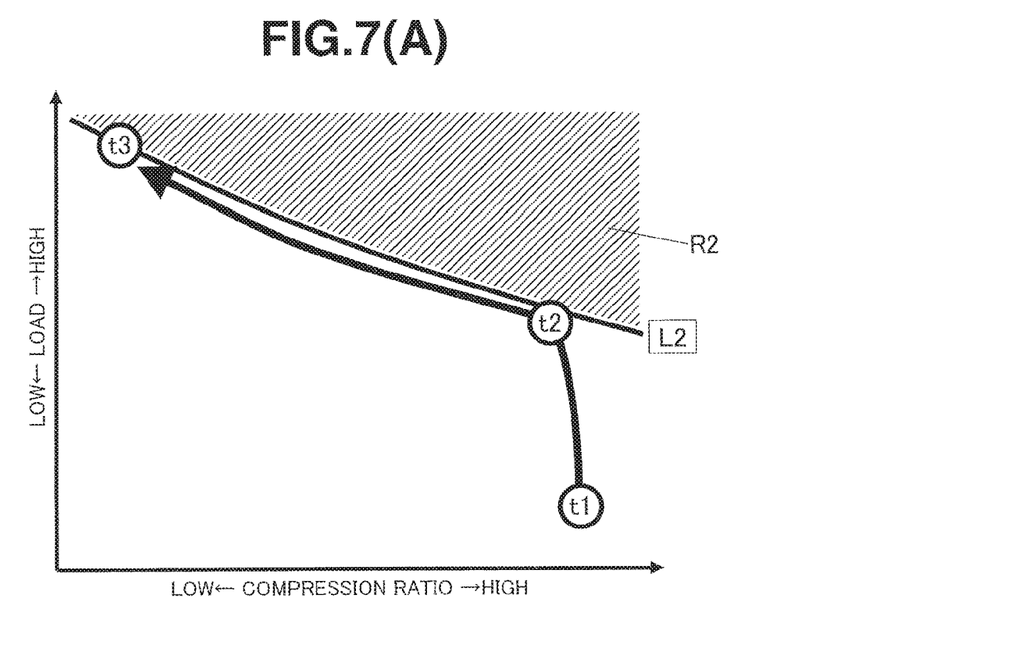
FIGS. 7(A) and 7(B) are explanatory views representing an operation at a time of an abrupt acceleration from a low load.
Figure 7B:
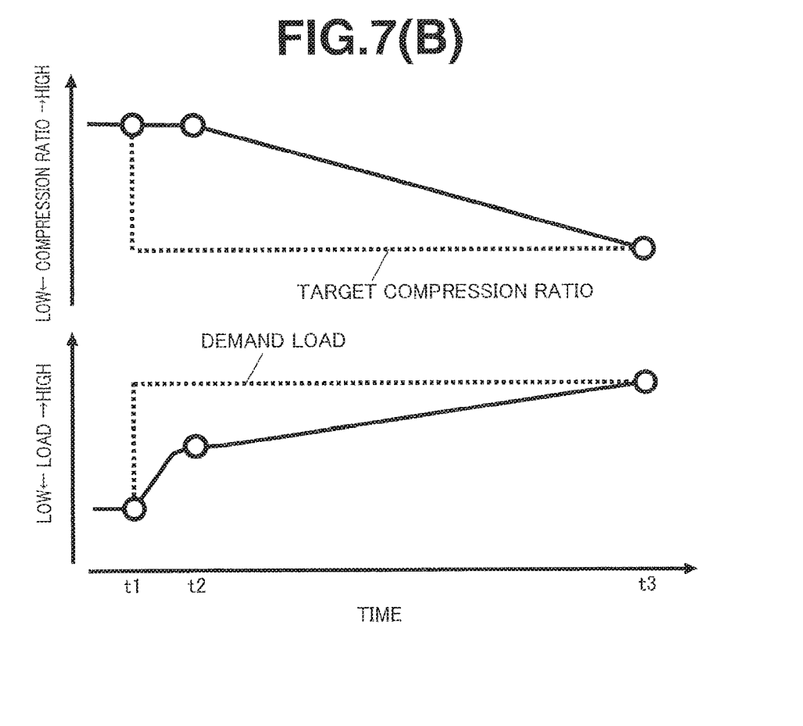

FIGS. 7(A) and 7(B) show explanatory views representing an operation when an abrupt acceleration request (demand) occurs from the low load state. Until a time t1, a steady-state driving is carried out under the low load. At a timing of time t1, since a demand torque is raised in a stepwise manner and a rise rate of this demand torque is high, second limiter L2 is selected through the control shown in FIG. 5. A time interval from time t1 to time t2 indicates a dead time during which the mechanical compression ratio can hardly respond as will be described later and the load (the supercharging pressure) is raised until the load is limited to second limiter L2 with the high compression ratio state kept. During a time interval from time t2 to time t3, the mechanical compression ratio responds so that the mechanical compression ratio transfers to the low compression ratio side. At this time, the load (the supercharging pressure) is raised along second limiter L2.

In this way, in this preferred embodiment, even during the abrupt acceleration, a driving point does not fall into region R2 in which the problem in association with the excessive rich in the air-fuel mixture ratio occurs. Hence, the problem in association with the excessive rich in air-fuel mixture ratio does not occur.

Figure 8A:
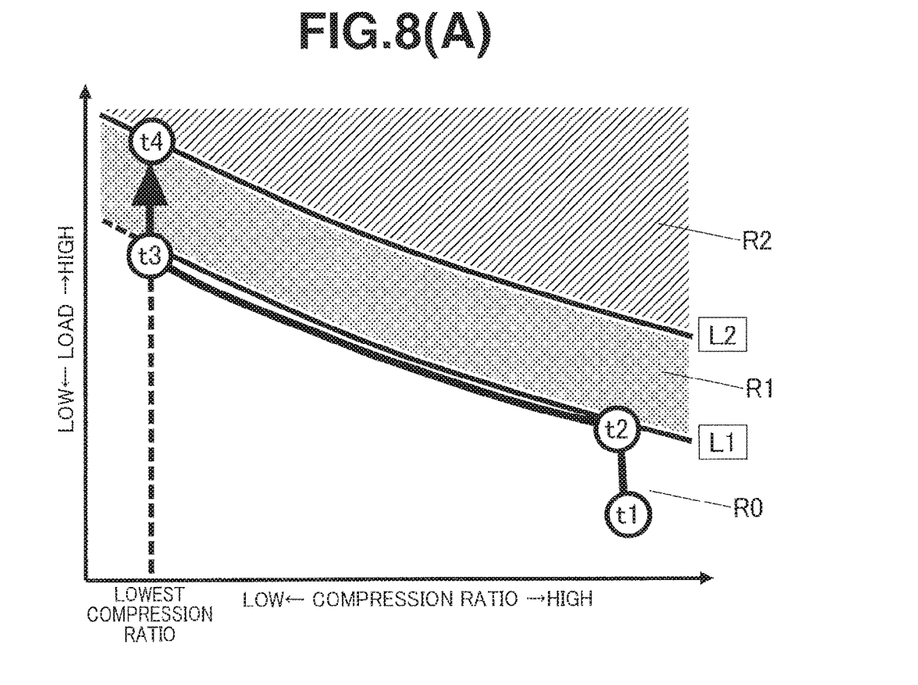
FIGS. 8(A) and 8(B) are explanatory views representing an operation at a time of a moderate acceleration from the low load.
Figure 8B:
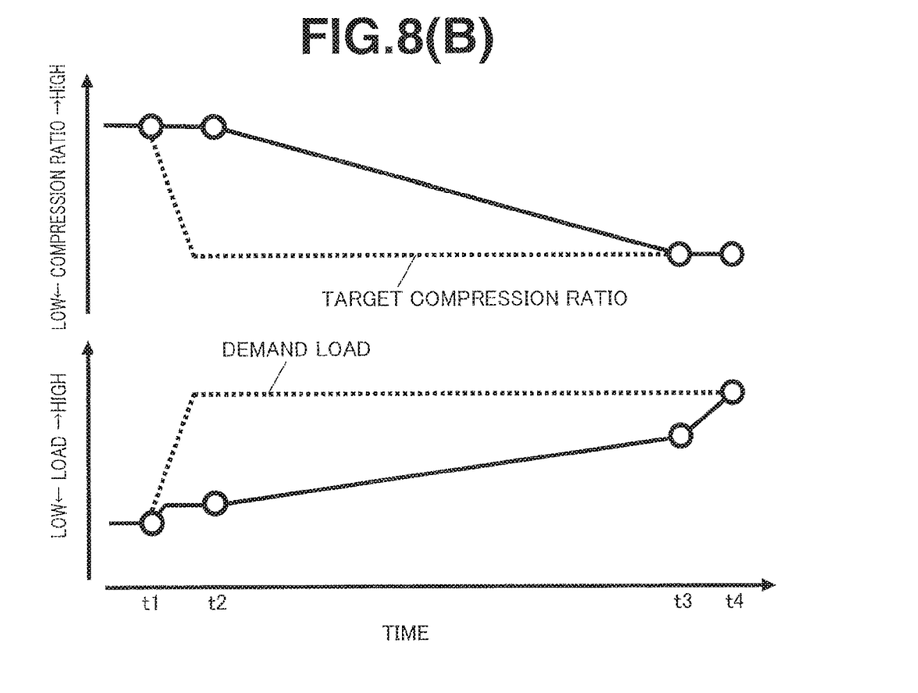

FIGS. 8(A) and 8(B) show explanatory views representing an operation when a moderate acceleration request (demand) from the low load state is present. Until time t1, the steady-state driving is carried out under the low load. At a timing of time a rise in the demand load is started moderately. Since the rise rate of the demand load is low, first limiter L1 is selected through the control shown in FIG. 5 described above. The time interval from time t1 to time t2 is the dead time during which the mechanical compression ratio can hardly respond and the load is raised until the mechanical compression ratio is limited to first limiter L1, with the high compression ratio state kept. The load is continued to be raised along first limiter L1 while the mechanical compression ratio respond during the time interval from time t2 to time t3. When, at time t3, the mechanical compression ratio reaches a lowest compression ratio, first limiter L1 becomes the same value as second limiter L2. While the mechanical compression ratio remains the constant (lowest compression ratio) from the time t3 to time t4, the load (supercharging pressure) is raised. In addition, after time t3, the load (supercharging pressure) is raised in association with the fuel increment.

In this way, since, during the moderate acceleration, the driving point invades into fuel increment region R1 until the mechanical compression ratio is lowered to the lowest compression ratio, the improvement in the fuel consumption (economy) can be achieved.

Figure 9A:
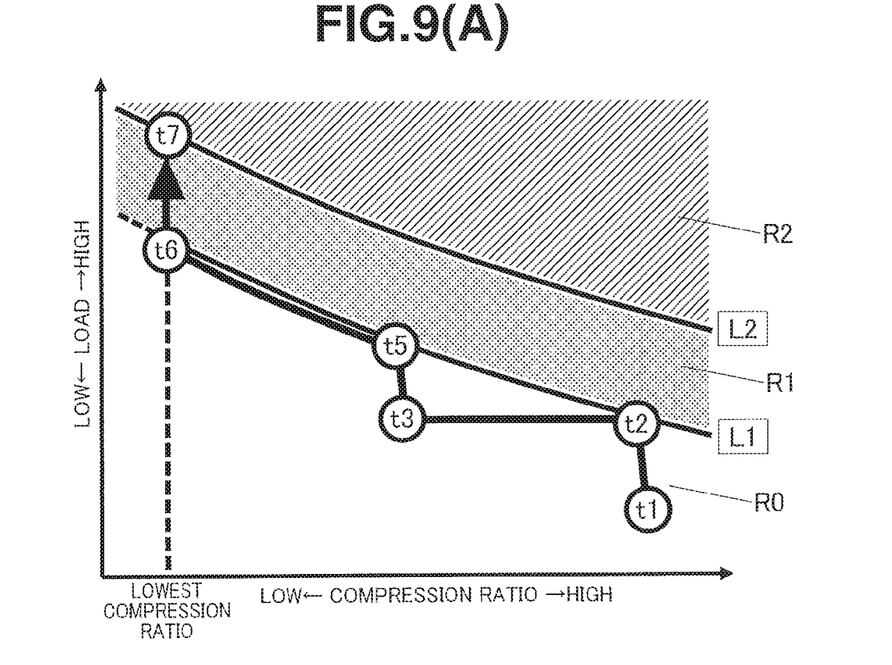
FIGS. 9(A) and 9(B) are explanatory views representing an operation at a time of the moderate acceleration starting from the low load, a steady state, and ended at a high load.
Figure 9B:
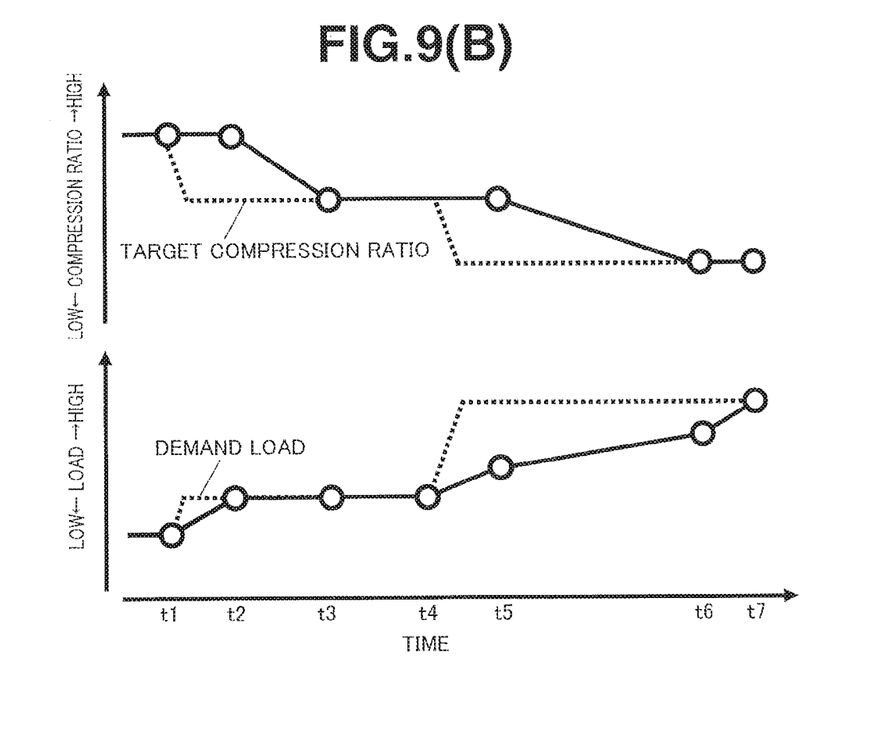

FIGS. 9(A) and 9(B) show timing charts of a case where the moderate acceleration request (demand) from the low load to a middle load is present and the moderate acceleration request (demand) from the middle load to the high load is present once after the steady-state driving is carried out.

Until time t1, the steady-state driving is carried out under the low load. At a timing of time t1, the rise of the demand load is moderately started and first limiter L1 is selected. The time interval between time t1 and time t2 is the dead time during which the mechanical compression ratio can hardly respond. The load is raised up to time t2 at which the mechanical compression ratio is limited to first limiter L1, with the high compression ratio state maintained. During a time interval between time t2 and time t3, the compression ratio is lowered toward the target compression ratio with the load (the supercharging pressure) maintained at a constant. When the compression ratio reaches the target compression ratio at time t3, the steady-state driving under the middle load is carried out. When the moderate acceleration request (demand) again occurs at a time t4, the load (the supercharging pressure) to first limiter L1 rises since the time interval between time t4 and time t5 is the dead time during which the mechanical compression ratio can hardly respond. When the load (the supercharging pressure) reaches first limiter L1, the supercharging pressure is limited to first limiter L1 and, thus, the mechanical compression ratio is lowered along first limiter L1 and the load (the supercharging pressure) is gradually raised. When the compression ratio reaches the lowest compression ratio, the driving point enters fuel increment region R1. During a time interval between time t6 and time t7, the supercharging pressure is raised in a state in which the mechanical compression ratio is held to the lowest compression ratio.

In this embodiment, since the driving point can be avoided from being invaded into fuel increment area (region) R1 if at all possible in a wide driving range from the low load to the high load, the improvement in the fuel consumption (economy) can be achieved.

Incidentally, the dead time is present in a variable device such as variable compression ratio mechanism 20. Within this dead time, the variable device cannot substantially respond to the request (demand) of modification due to a period of time during which a driving target is, in general, accelerated, calculation and communication delays of an electronic control, and so forth.

Therefore, when, in a case where the supercharging pressure is limited on a basis of the mechanical compression ratio as described in this embodiment, a combination of the supercharging pressure and the mechanical compression ratio set in the steady-state driving state is the same as the combination of the compression ratio and the load limitation values or too approach to each other, the load cannot be raised during the dead time of variable compression ratio mechanism 20 even if the demand load is raised. This causes a delay in a vehicle behavior with respect to an accelerator operation by the driver in the internal combustion engine for the vehicle. Hence, this brings a reduction in a drivability and an increase in the depression of an unnecessary accelerator pedal is induced and a worsening of the fuel consumption is introduced. In order to suppress the reduction in the drivability and the worsening of the fuel consumption (economy), in the steady-state driving, a margin up to the load limitation values may be taken by setting the low compression ratio sufficiently lower than the combination of the compression ratio and load limitation values. In this case, it follows that the compression ratio in the steady-state is lowered so that the fuel consumption (economy) in the steady-state becomes worsened.

Therefore, preferably, in the steady-state load driving state, the driving is carried out, with the mechanical compression ratio lowered by a predetermined quantity than the mechanical compression ratio limited by the corresponding load and, as a reduction (gear) ratio of automatic transmission 8 becomes larger, a lowering quantity of the mechanical compression ratio is made smaller. In other words, as a state becomes easier to be transmitted to a driver as a vehicular behavior even under a small load rise, the lowering quantity of the mechanical compression ratio is made smaller. Thus, as compared to a case where the lowering quantity of the mechanical compression ratio is uniformly set, the fuel consumption (economy) can be improved without giving an unpleasant feeling to the driver.

Figure 6:
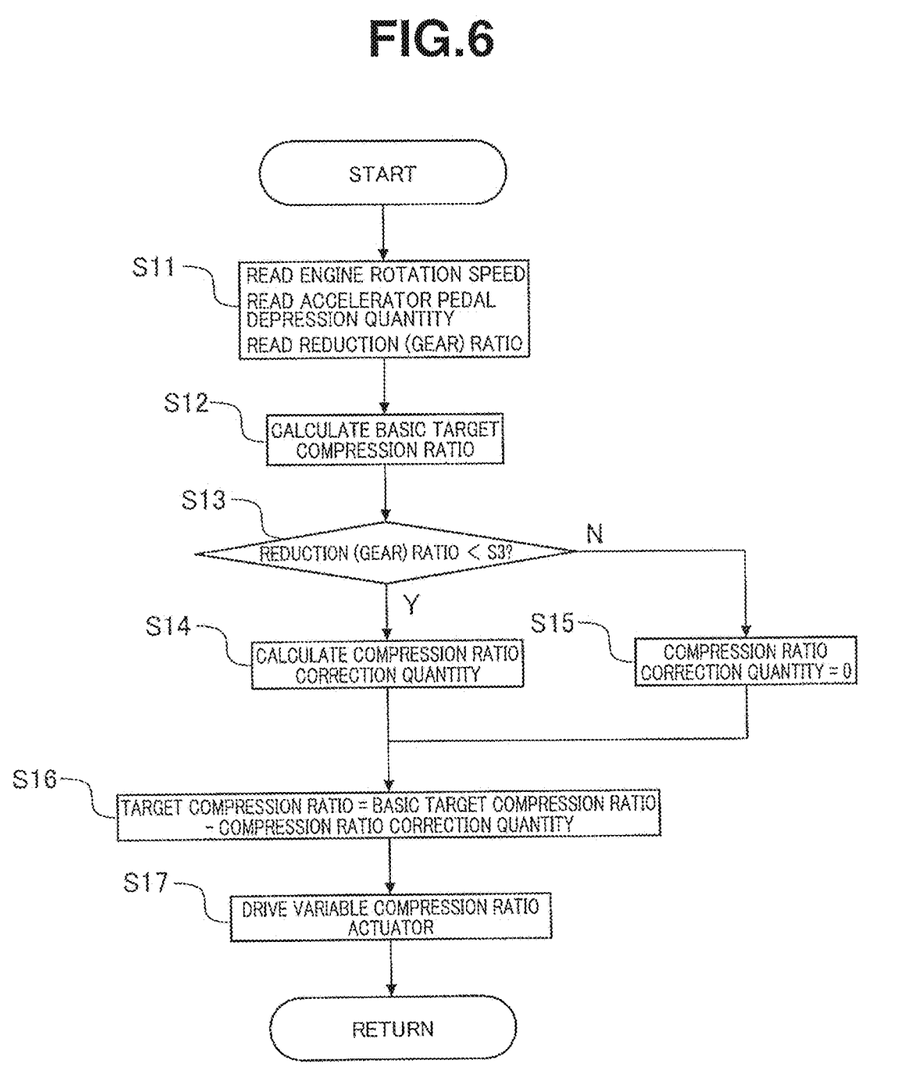
FIG. 6 is a flowchart representing a flow of a compression ratio control in the above-described preferred embodiment.

FIG. 6 shows a flowchart representing a flow of control of the mechanical compression ratio.

At a step S11, control section 6 reads the engine (rotation) speed, the accelerator pedal depression quantity, and the reduction (gear) ratio of automatic transmission 8. At a step S12, control section 6 calculates a basic target compression ratio previously stored as a map of the engine rotation speed and the accelerator pedal depression quantity. At a step S13, control section 6 determines whether the reduction ratio of automatic transmission 8 is smaller than a predetermined third threshold value S3. If smaller than predetermined third threshold value S3, the routine goes to a step S14. If not smaller than third threshold value S3, the routine goes to a step S15. At step S14, control section 6 calculates a compression ratio correction quantity from the reduction (gear) ratio of automatic transmission 8. This compression ratio correction quantity is calculated using a preset and/or previously stored map or a table as a function such that, as the reduction (gear) ratio becomes larger, the correction quantity is made smaller. At step S15, control section 6 sets the compression ratio correction quantity to zero and the routine goes to a step S16. This reason is that, for example, in such a reduction ratio as a lowest gear by which a driving force can sufficiently largely be outputted but is not so much used in a steady-state traveling, an unnecessary reduction in the compression ratio cannot be carried out.

At step S16, control section 6 subtracts the compression ratio correction quantity from the basic target compression ratio to calculate the target compression ratio. Although not shown in the flowchart, the target compression ratio is assumed to be the lowest compression ratio in a case where the target compression ratio is lower than the lowest compression ratio. At a step S17, electrically driven (drive) motor 33 is drivingly controlled on a basis of the target compression ratio. It should be noted that, since the mechanical compression ratio between time t3 and time t4 in FIGS. 9(A) and 9(B) is an example in a state in which the reduction (gear) ratio is sufficiently small. In a case of the large reduction ratio, the load (the supercharging pressure) approaches the mechanical compression ratio at a time point of time t2 at which the driving on first limiter L1 is carried out. In this embodiment, the turbo charger (exhaust turbine super charger) which supercharges intake air is used utilizing the exhaust energy. However, the present invention is not limited to the turbo charger but the present invention is applicable to a mechanical supercharger which supercharges intake air utilizing a rotational energy of the crankshaft.

Next, a characteristic structure of the above-described embodiment, an action thereof, and an effect thereof will be listed.

(1) Variable compression ratio mechanism 20 which is capable of modifying the mechanical compression ratio, the turbo charger which supercharges intake air utilizing the exhaust energy, and exhaust bypass valve 7 which adjusts the supercharging pressure as the supercharging pressure adjustment mechanism are equipped, wherein the mechanical compression ratio is detected and the above-described supercharging pressure is limited on a basis of the mechanical compression ratio.

In this way, since the supercharging pressure is limited on a basis of the mechanical compression ratio, in a transient state such that the supercharging pressure is varied in accordance with the demand load, even if a response speed of variable compression ratio mechanism 20 is slow, an excessively high supercharging pressure can be suppressed. In addition, it becomes possible to perform the driving in a range in which a problem accompanied by the excessively rich of the air-fuel mixture ratio does not occur, with the fuel increment suppressed.

(2) More specifically, as the mechanical compression ratio becomes higher, the supercharging pressure to be limited is lowered. In this way, by lowering the supercharging pressure to be limited as the mechanical compression ratio becomes higher, during the high load in the internal combustion engine equipped with the turbo charger, the generation of knocking and the excessive cylinder inner pressure rise can be suppressed. In the driving state in which an exhaust temperature at a time of the high compression ratio becomes lowered than that at a time of the low compression ratio, with the retardation of the ignition timing taken into account, the driving in the range in which the problem in association with the excessively rich in the air-fuel mixture ratio does not occur can be carried out.

(3) In a case where the fuel increment is carried out during the acceleration during which the demand load is raised, a fuel consumption performance and an exhaust performance are reduced as a degree of the fuel increment becomes larger even if the fuel increment is carried out in a range in which the problems in association with the excessive rich in the air-fuel mixture ratio such as emission of smoke, combustion failure, carbon fouling of the ignition plugs, and so forth do not occur. Hence, in the transient state such that the demand load is raised, the degree of pace of the rise in the demand load is determined and the limit value of the supercharging pressure is modified in accordance with the degree of pace of the rise in the demand load.

For example, when the demand load is abruptly raised, the fuel increment is allowed in the range in which the problems do not occur so as to raise the supercharging pressure as early as possible. On the other hand, when the demand load is moderately raised, the rise in the supercharging pressure is delayed until the mechanical compression ratio is sufficiently lowered. Consequently, the degree of the fuel increment can be suppressed to be small.

(4) In a case where the degree of pace of the rise in the demand load is moderate, the supercharging pressure is limited to predetermined first limiter L1 or lower at which the driving at the stoichiometric air-fuel mixture ratio under the above-described mechanical compression ratio is possible. On the other hand, in a case where the degree of pace of the rise in the demand load is abrupt, the supercharging pressure is limited to second limiter L2 whose supercharging pressure is higher than first limiter L1 or lower. In addition, the driving in a rich state in which the air-fuel mixture ratio is lower than the stoichiometric air-fuel mixture is carried out.

In this way, in a case where the rise in the demand load is moderate, the limitation is placed on the supercharging pressure at which the driving is possible at the stoichiometric air-fuel mixture ratio, the improvement in the fuel consumption (economy) is achieved while suppressing an opportunity at which the fuel increment is carried out. At the same time, in a case where the rise in the demand load is abrupt, the limitation of the supercharging pressure is mitigated using second limiter L2 whose supercharging pressure is higher than first limiter L1. Consequently, the supercharging pressure can speedily be raised.

EXPLANATION OF SIGNS

1 . . . internal combustion engine
2 . . . turbo charger
7 . . . exhaust bypass valve (supercharging pressure adjustment mechanism)
8 . . . automatic transmission
20 . . . variable compression ratio mechanism
34 . . . control shaft sensor

The invention claimed is:
1. A control method for an internal combustion engine, the internal combustion engine including: a variable compres- sion ratio mechanism which is capable of modifying a mechanical compression ratio of the internal combustion engine; a supercharger which supercharges intake air; and a supercharging pressure adjustment mechanism which adjusts a supercharging pressure and the internal combustion engine carrying out a fuel increment at a high supercharging pressure side, the control method comprising:

detecting the mechanical compression ratio;

setting an upper limit value of the supercharging pressure on a basis of the mechanical compression ratio; and adjusting the supercharging pressure not to exceed the upper limit value of the supercharging pressure, the upper limit value of the supercharging pressure falling within a driving region in which the fuel increment is carried out.

2. The control method for the internal combustion engine as claimed in claim 1, wherein, as the mechanical compression ratio becomes higher, the upper limit value of the supercharging pressure is made lower.

3. The control method for the internal combustion engine as claimed in claim 1, wherein, in a transient state in which a demand torque is raised, the control method determining a degree of pace of a rise in the demand load and adjusting the upper limit value of the supercharging pressure in a case where the degree of pace of the rise in the demand load is abrupt.

4. The control method for the internal combustion engine as claimed in claim 3, wherein, in a case where the degree of pace of the rise in the demand load is moderate, the supercharging pressure is adjusted not to exceed a second upper limit value of the supercharging pressure which is lower than the upper limit value of the supercharging pressure and which falls in a driving region in which a driving at a stoichiometric air-fuel mixture ratio is possible.

5. A control apparatus for an internal combustion engine, comprising:

a variable compression ratio mechanism which is capable of modifying a mechanical compression ratio;

a supercharger which supercharges intake air;

a supercharging pressure adjustment mechanism which adjusts a supercharging pressure;

a compression ratio sensor configured to detect the mechanical compression ratio; and a control section configured to, at a high supercharging pressure side, carry out a fuel increment and detect a mechanical compression ratio, set an upper limit value of a supercharging pressure on a basis of the mechanical compression ratio, and adjust the supercharging pressure not to exceed an upper limit value of the supercharging pressure, the upper limit value of the supercharging pressure falling in a driving region in which the fuel increment is carried out.

* * * * *